May 31, 1966  R. J. COLEMAN ETAL  3,253,931
METHOD OF DEHYDRATING MEAT AND PRODUCT
Filed Dec. 29, 1964  2 Sheets-Sheet 1
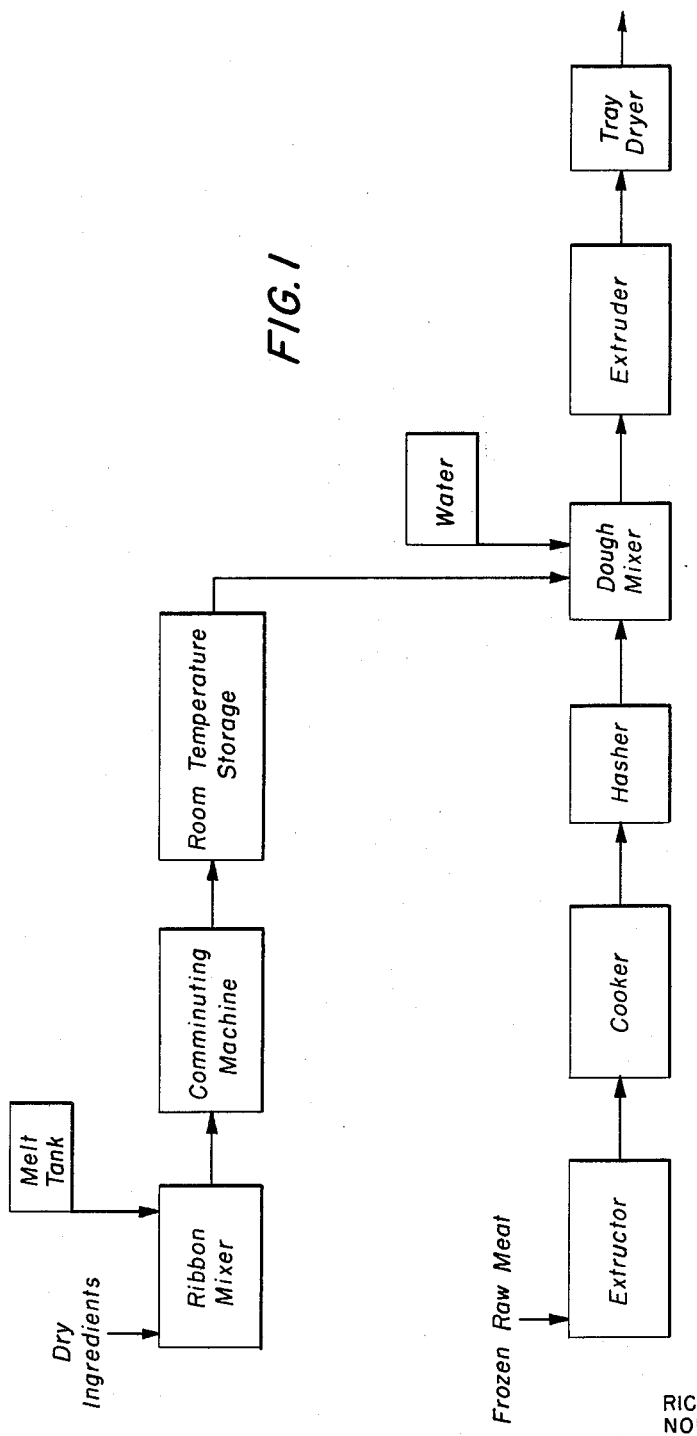
INVENTORS
RICHARD J. COLEMAN &
NORMAN S. CRESWICK
BY
their  ATTORNEYS

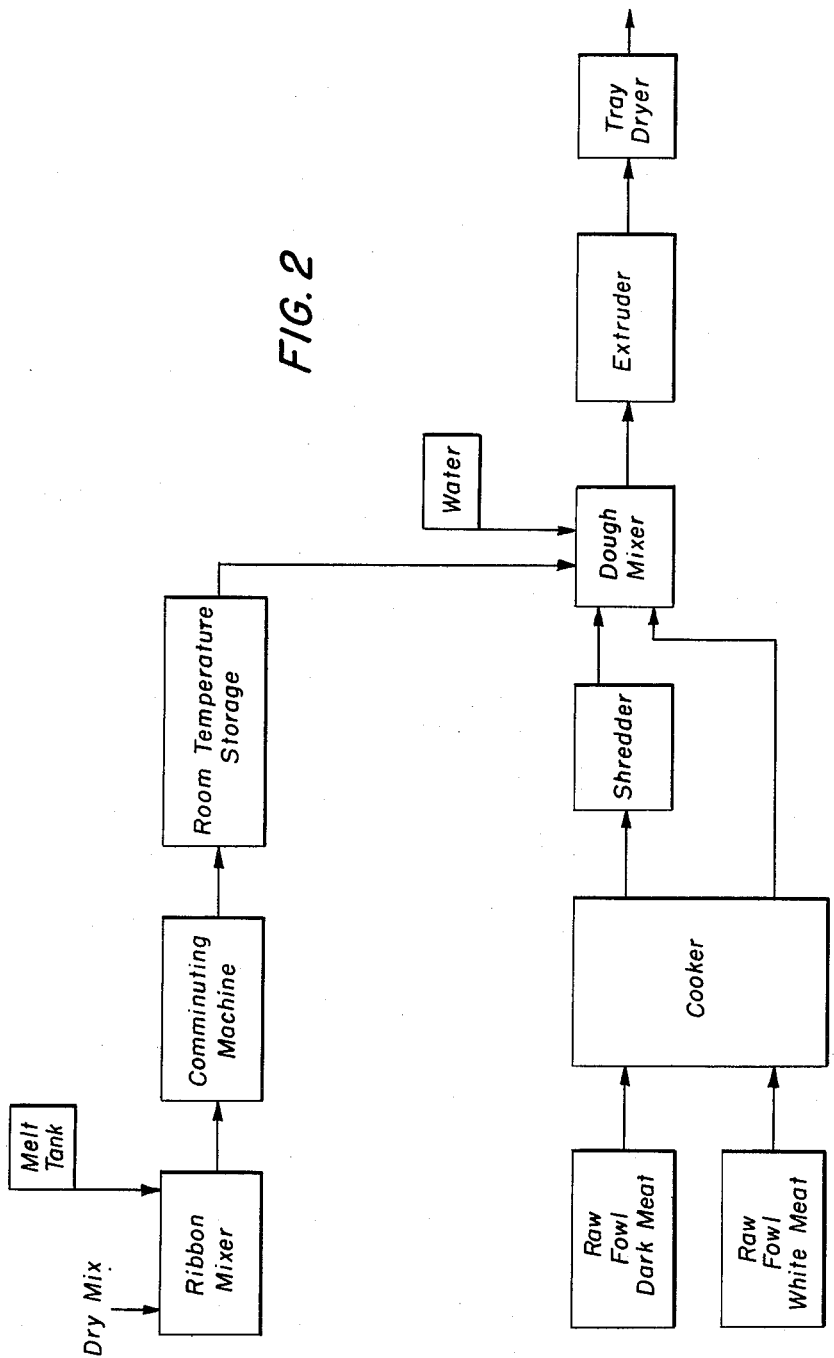

United States Patent Office 3,253,931
Patented May 31, 1966

3,253,931
METHOD OF DEHYDRATING MEAT AND PRODUCT
Richard J. Coleman, Highland Park, Ill., and Norman S. Creswick, Cresskill, N.J., assignors to Thomas J. Lipton, Inc., Englewood Cliffs, N.J., a corporation of Delaware
Filed Dec. 29, 1964, Ser. No. 421,758
8 Claims. (Cl. 99—208)

This application is a continuation-in-part of our co-pending application, Serial No. 155,473, filed November 28, 1961, now abandoned.

This invention relates to an improved method for the preparation of dehydrated meat products and to an improved dehydrated meat product. The invention also relates to foods containing dehydrated meat products.

Presently known methods for preparing dehydrated meat products and the dehydrated meats prepared thereby have a number of disadvantages. Generally speaking, the tenderness, color and flavor of the rehydrated products is determined by the characteristics of the original meat. For this reason, the meat employed must be carefully selected and only the best meat should be used in preparing dehydrated products. Even when these considerations are followed, the dehydration process causes a significant flavor loss. Where the flavor of the dehydrated product may be acceptable when first prepared, it degenerates rapidly during storage, so that after a few weeks, the flavor of the product becomes completely unacceptable. In many cases, the color of the meat is irreversibly changed as well. In addition, dehydrated natural meats rehydrate slowly, and with difficulty.

It is an object of this invention to provide a method for improving the stability of dehydrated natural meat to undesirable flavor changes during storage.

It is another object of this invention to provide a dehydrated meat product having improved stability to flavor change during storage.

These and other objects of the invention will be set forth more fully hereinafter.

It has now been found that an improved dehydrated meat product is obtained by reducing a natural meat to its basic fibers or small bundles thereof, incorporating the fibers in an aqueous plastic mass or matrix of edible, heat-coagulable protein selected from the group consisting of edible, heat-coagulable vegetable proteins and mixtures thereof with edible, heat-coagulable animal protein, forming the mass to a desired shape, coagulating the protein of the matrix about the fibers, and then drying. Preferably, the fibers or small bundles thereof are at least partially aligned in the plastic mass before the coagulation step.

Loss of flavor both initially and during storage of the dehydrated product is markedly reduced by following the technique of this invention. The chewability and texture of the reconstituted product is excellent. The rehydration characteristics of the product of this invention are good and the product may be rehydrated in the presence of heated water in a short time to provide a high quality product. Any meat, regardless of original toughness may be used to provide a product having uniform texture and desirable chewiness. Blends of meats may be used to achieve any desired combination of flavor characteristics. As an additional advantage of the process, it has been found that the product is more readily dried.

The dehydrated products of this invention may be prepared with any of the lean natural meats, such as pork, beef, goat and lamb, as well as fowl, such as chicken and turkey, and various sea foods, such as shrimp, crab, lobster, clams, fish and the like. Thus, the term meat, as used herein and in the appended claims refers to striated skeletal muscle tissue. The striated muscle tissue is generally composed of bundles of muscle fibers, held together by connective tissue. The fibers, usually about 10–100 microns in diameter, are in turn composed of many fibrils, which are about 1 micron in diameter. The fibrils are arranged parallel to each other and to the fiber axis.

In preparing the meat for use in accordance with the invention, lean meat, substantially free of visible fat, is selected. The meat is then reduced to short discontinuous rod-like fibers, or small bundles of fibers, by shredding, tearing or other mechanical means.

In those instances where the rehydrated product is to be consumed in a cooked condition, at least some degree of cooking preferably takes place before dehydration is completed. With those meats requiring a relatively long cooking time, it is immaterial whether the cooking takes place before or after the meat is reduced to a form of short discontinuous rod-like fibers or bundles thereof. Meats such as beef and pork may be cooked before their reduction to the fiber form, although cooking may be carried out subsequent to reduction of the meat to fiber form if desired. With sea foods, however, it is preferred that the meat be subdivided to a fiber form while the meat is in an uncooked state, and that the cooking step take place during the subsequent heat-coagulation and drying steps of the process. In some cases, a mixture containing fibers and bundles thereof of a more uniform dimension is obtained if the meat is frozen before being mechanically reduced to the fiber form.

The dimension of the fibers and bundles thereof can be varied depending upon the type of meat used and upon the texture and rehydration characteristics desired in the final product. Another important consideration in this regard is the intended end use of the dehydrated product. In the case of beef, for example, preferred dimensions of fibers and fiber bundles for a product which will be subsequently used in a dehydrated soup mix, are from 0.010 inch to 0.060 inch in diameter and from 0.25 inch to 1.5 inches long. Meat fiber lengths below ⅛ inch tend to result in poorly textured products, i.e., products which provide, on chewing, a sensation similar to that obtained when chewing a tough rubbery gel, rather than that obtained by chewing a cooked piece of meat. Fiber and fiber bundle lengths in excess of ¾ inch may lead to difficulties during extrusion in certain types of equipment. The optimum length for the above purposes is ⅛ inch with beef, and ½ inch in the case of chicken.

The meat fibers and fiber bundles formed as described above are mixed with an aqueous paste containing an edible, water-soluble heat-coagulable protein selected from the group consisting of edible, heat-coagulable vegetable proteins and mixtures thereof with edible, heat-coagulable animal protein. The mixture is thoroughly mixed to form a plastic mass or dough, in which the meat fibers are intimately coated with the protein and other components of the paste. The dough is then preferably extruded or formed in some manner into an article of the desired shape. If extrusion through relatively small openings is used, the resulting ribbon of extruded material is broken into small portions resembling ground meat in appearance. During extrusion, the meat fibers are substantially aligned parallel to each other and to one dimension of the shaped product.

After shaping, the product is heated to coagulate the protein matrix and is thereafter dehydrated to a suitable moisture content, preferably ranging from about 2 to about 6%, with an optimum at 4%, by weight. The coagulated protein matrix provides structural integrity to the dehydrated product and provides a desirable texture in the rehydrated product.

One preferred method of forming the plastic mass and at the same time causing substantial aligning of the natural meat fibers is extrusion of the plastic mass through a restrictive orifice such as that found in a meat grinder.

A finished, dried product, containing 4% moisture, should contain from about 40 to about 70% of meat fibers. In addition, the product should contain from about 10 to about 40% of heat-coagulable protein, an optimum level being 35%. Where more than about 40% of the final product is heat-coagulable protein, the product has inferior organoleptic properties, whereas products having less than tbout 10% of heat-coagulable protein are less stable during storage and revert to a product having the undesirable characteristics of pure dehydrated meat.

Dehydration conditions should be carefully regulated to insure that the product is not overheated and, at the same time, that drying occurs within a reasonable length of time. Where the product is in the form of ground meat, drying of the product in an oven in air heated to 180° F. for a period of about two hours has been found to be satisfactory. A circulating air dryer may be used for the same form of product, and the drying conditions may vary from 150° F. to 210° F. using an air velocity of from 100 to 300 feet per minute.

While the coagulation and drying steps are conveniently conducted simultaneously, they can be conducted as separate processing steps if desired. It is preferred that the coagulation and drying of the product take place at as low a temperature as possible to assure the obtention of a tender texture in the rehydrated product.

The nature of the heat-coagulable protein matrix has been found to be an important consideration in preparing a product which will provide the desired texture on rehydration and which will rehydrate within a reasonable period of time. Acceptable products have been obtained using a heat-coagulable vegetable protein alone, such as the sodium proteinate of soybean protein, and with combination of heat-coagulable proteins of animal and vegetable origin. However, the use of egg albumin alone as the heat coagulable protein provides a product which is extremely tough on rehydration and which has an unacceptably slow rate of rehydration. Best results have been obtained by combining egg albumin with a heat-coagulable protein of vegetable origin such as a sodium proteinate derived from soybean.

One suitable heat-coagulable vegetable protein found useful according to this invention is the sodium proteinate of soybean protein. This material is presently available as Promine D (90% protein) and as Promax (70% protein).

Promine D is an isolated soya protein comprising the major proteinaceous fraction of soybean prepared from high quality, sound, clean, dehulled soybeans by removing a preponderance of non-protein components and containing not less than 90% protein ($N \times 6.25$) on a moisture free basis.

Promine D is prepared by extracting soy flakes with water at pH 8 to separate soluble protein, carbohydrates and mineral constituents from the insoluble matter. The protein-containing extract is then separated from the residual flake material and acidified to pH 4.6 with food grade hydrochloric acid to precipitate the (acid precipitatable) globulin fraction. The resulting curd is then separated, washed with water and dispersed at pH 7 with a solution of food grade NaOH. This dispersion is then spray dried to produce the finished product which is a water dispersible form of isolated soya protein. It is a bland green-white powder, with a particle size in the approximate range of 20–110 microns, and an average particle size of 50 microns.

Neutral, water insoluble soybean protein preparations such as Promine R and Isopro may be used, providing they are solubilized with appropriate amounts of an alkaline material such as sodium carbonate, trisodium phosphate or sodium hydroxide.

Another edible heat-coagulable protein found suitable for use according to this invention is that isolated from sesame seeds when used in combination with egg albumin. Wheat gluten also provides satisfactory results, either alone, or in combination with egg albumin.

According to a preferred embodiment of this invention, the heat-coagulable protein matrix is prepared by combining egg albumin and sodium proteinate of soybean protein in the range of proportions by weight of from 1:17 to 1:5. Higher contents of egg albumin provide a product which is unacceptably slow in rehydration and tends to be tough and rubbery in character. Reducing the concentration of egg albumin below that specified in the preferred ranges provides a more tender product, but such a product is nevertheless acceptable under some use conditions. A preferred matrix forming composition with chicken meat contains egg albumin and a sodium proteinate of soybean protein in the weight ratio of about 1:9.

Certain salts including sodium chloride and the nitrates and nitrites may be added to the compositions of this invention for flavor purposes and as bacteriostatic agents. Where sodium chloride is employed, an amount ranging from 1.5 to 5%, by weight of an aqueous dough containing 50% water may be used. A level of 3% on the same basis is preferred. On a dry product basis, i.e., a product containing 4% moisture, the salt content should range from 6 to 12%, with 7.5% being optimum. The nitrates and nitrites may be the sodium salts, and are employed at the usual meat preserving level.

It is further preferred that a small amount of a fat be added to the product of this invention. The fat may be any type of edible stable fat such as hydrogenated cottonseed oil, hydrogenated sesame oil and the like. Unhydrogenated or lightly hydrogenated oils may be used, providing they do not undergo undesirable flavor or color changes during storage. Liquid vegetable oils containing anti-oxidants or other stabilizing agents are satisfactory. It is preferred that the fat have an iodine value of no more than 63.5, a Wiley melting point within the range of 108–112° F. and a stability of at least 100 hours, as determined by the Swift test.

The fat is preferably added as a coating on the hydrophillic dry components used in preparing the protein matrix. A suitable level of fat has been found to be about 4% in an aqueous dough containing 50% moisture. In the dried product containing 4% moisture, the total fat content should range from about 10% to about 25%.

The moisture content of the plastic dough containing the meat fibers may be adjusted to provide the best handling characteristics. Generally speaking, a moisture content of from 40 to 60% in the dough should be used. A moisture content of 45–55% provides optimum extrusion conditions.

After drying, the product may be subdivided into dehydrated particles of suitable dimensions. Where the product has been extruded through a meat grinder, particles the size of small chunks of meat are obtained, which may be used as one constituent of soup mixes, dehydrated dinners, sauce mixes and other food products. Larger size extruded products may be formed into various shapes such as chops, in which case the dehydrated product may be prepared for consumption by rehydration and frying.

The meat fibers used in the process of this invention are prepared by mechanical attrition of the meat. A Fitzpatrick Mill has been found to be suitable for this purpose. Other devices which are useful in forming the meat fibers are a roller mill, a hammer mill, a meat hasher and a shredding device similar to the type commonly used by housewives for making salads. A Rietz disintegrator and a Buffalo Silent Cutter are also suitable.

The plastic protein mass containing meat fibers may be extruded by using a meat grinding device as described above. In addition, a Greer Extruder of the screw type may be used. Both of these devices cause a degree of alignment of the meat fibers during the extrusion procedure. In another embodiment, the meat fibers may be prealigned by passing the plastic mass through rollers. The product can then be sheeted in a manner similar to the handling of cookie doughs. The mass may be formed into desirable shapes during passage through the rollers, or in a subsequent operation.

The process of this invention will be further illustrated by reference to the attached drawings in which:

FIG. 1 is a flow diagram describing one embodiment of the process of this invention as applied to raw lean meat, such as beef; and FIG. 2 is a flow diagram of the process of this invention as applied to the raw meat of fowl, such as chicken.

Referring to FIG. 1, all of the dry ingredients, including the heat-coagulable protein, salt, spices and fat, are mixed in a ribbon mixer. In preparing this dry mix, all of the dry ingredients, except the fat, are added to the mixer, and mixed for a period of time sufficient to provide a uniform mixture, e.g., ten minutes. The fat is melted (130–135° F.) and added in liquid form. Mixing is continued for another period of time sufficient to provide a uniform mixture, e.g., ten minutes. The mixture is then passed through a comminuting machine, such as a Fitz mill, having a ¼" round hole screen, or a hammermill machine having a ¼" herringbone screen. The dry mixture is then stored at room temperature until needed.

Blocks of frozen raw meat are first fed to an extructor to reduce the frozen meat to chunks of a size suitable for cooking. A suitable apparatus for this step is a Rietz Extructor, Model RE-15, fitted with a 22 spoke regular plate. The beef pieces are then fed to a cooker, such as a Rietz Thermascrew, 16" by 15' model, where they are cooked with steam at a pressure of 10 p.s.i.g. in a continuous manner. The excess fat and water mixture resulting from the cooking is drained off. The aqueous portion of this mixture may be separated and used at a subsequent point in the process as a source of water in preparing the dough, if desired.

The cooked beef pieces leaving the cooker are then subdivided to fiber form, i.e., fibers and bundles thereof, by use of a hasher, such as an Allbright-Nell hasher, Model 766, using ⅛" diameter holes in the die plate. The temperature of the meat after leaving the cooker is approximately 160° F., and after leaving the hasher it is about 140° F.

The dry ingredients and the cooked meat in fiber form are then combined in a dough mixer in appropriate proportions. A suitable mixer is the Hobart dough mixer. The temperature of the mass during mixing in the dough mixer is about 120° F. at the start. The action of mixing together with the addition of water at about 60° F. reduces the temperature of the mass to about 80° F. at the conclusion of mixing.

It is preferred that the dry ingredients of the cooked meat fibers be thoroughly mixed before water is added thereto. Following its preparation, the dough is then fed to an extruder. A suitable extrusion device is a modified Enterprise grinder with nominal ⁷⁄₃₂" holes in the die plate. As the dough is extruded, it is cut by means of cutter blades into particles of the desired dimensions.

The extruded dough particles are then taken to a dryer, such as a Schilde tray drier. A preferred bed depth is approximately ¾". Circulating air at 228'/min. through the loaded bed at a temperature of 200° F. for one hour provides a final moisture content of 4% or less in the product.

Referring to FIG. 2, the dry ingredients are combined as described above. The dark meat and white meat of fowl are cooked separately. The dark meat, being more difficult to break down than the white meat, is reduced into fiber form in a shredder. A suitable shredding device is a conventional Hobart dough mixer of 140 quart capacity. Suitable results are obtained by operating the mixer for two minutes at speed 2 with a 75 lb. charge of cooked dark meat.

White meat, because of the ease with which its fibers separate, requires no separate hashing step. The dough mixer, during the step of combining the meat with the dry ingredients, causes the white meat to subdivide to fiber form. Extrusion and drying are accomplished in the same manner as that discussed above in respect to FIG. 1.

The following specific examples will serve to illustrate this invention:

EXAMPLE I

Blocks of raw frozen lean beef were cut into pieces measuring approximately 1½ inches square. The meat was thawed and cooked for a period of 15 minutes in a pressure cooker at 15 pounds per square inch gauge. After cooking, the pieces of meat were refrozen to 10° F. and mechanically reduced to fibers of between ⅜ inch and 1½ inches in length and from 0.02 to 0.06 inch in diameter in a Fitzpatrick Mill.

A premix was then made by combining, by weight, 6 parts of a sodium proteinate of soy protein (Promine D), 1 part of hydrogenated cottonseed oil having an iodine value of 63.5 and a Wiley melting point of 108–112° F., and 1 part of sodium chloride, and by thoroughly agitating the mixture to coat the proetin particles with fat. About 2 parts by weight of the meat fibers, still in a frozen state, were coated with about 1 part by weight of the premix by thorough mixing. Water was then added to the mixture in an amount sufficient to provide a dough or plastic mass having a moisture content of approximately 50%. The plastic mass was then well mixed and extruded through shaped openings of a meat grinder to form approximately cylindrical dough masses about ¼ inch in diameter. Extrusion of the dough through the restricted orifice also caused the cooked meat fibers to align themselves in parallel relation within the dough lengthwise in the cylinder. Following extrusion, the dough pieces were simultaneously heat coagulated and dried in a circulating air oven at a temperature of 175° F. using an air velocity of 200 feet per minute. Drying of the product under these conditions for about two hours provided a product having a moisture level of about 2%. The dehydrated product was mechanically broken into small pieces of random length to produce dehydrated beef "bits."

The dehydrated beef "bits" prepared above were placed in boiling water and cooked for 6 minutes. The rehydrated product had an excellent beef flavor and was very tender.

EXAMPLE II

Fresh chickens were cleaned and cooked in a pressure cooker at 15 pounds per square inch gauge pressure for 45 minutes. The chicken meat was deboned, formed into blocks and frozen to 10° F. The frozen blocks were subjected to mechanical shredding in a Fitzpatrick Mill to reduce the chicken meat to fibers.

A premix was made by combining, by weight, 1 part of dehydrated egg albumin, 5 parts of a sodium proteinate of soy protein, 1 part of cottonseed oil hydrogenated to a melting point of about 40° C. and 1 part of sodium chloride, and thoroughly mixing the ingredients to form a coating of fat on the protein. Two parts by weight of the meat fibers, still in a frozen condition, were thoroughly mixed with one part by weight of the premix to provide a uniform coating of fat over the frozen fibers. Water was then added to the mixture in an amount sufficient to provide a moisture level in the plastic dough of approximately 50%. The dough was then well mixed and extruded in a meat grinder to form dough masses, the extrusion process tending to align the meat fiber substantially parallel with the long dimension of the cylindrical dough mass.

The extruded dough pieces were then coagulated and dried in a circulating air oven at a temperature of 170° F. for about two hours, using an air velocity of 200 feet per minute. At the end of this time, a product having 4% moisture was obtained and the dried product was further subdivided to provide chicken "bits" approximately ½ inch long.

The dehydrated chicken "bits" prepared according to this example were placed in boiling water and cooked for 7 minutes. The rehydrated product had an excellent chicken flavor and tender texture. The rehydrated chicken "bits" were similar to freshly cooked chicken meat in respect to flavor, chewability and tenderness.

EXAMPLE III

Fresh-uncooked shrimp, frozen at a temperature of about 10° F., were mechanically shredded in a Fitzpatrick Mill to produce frozen shrimp fibers. A premix was then made by combining, by weight, 1 part of dehydrated egg albumin, 5 parts of a sodium proteinate of soy protein, 1 part of hydrogenated cottonseed oil and 1 part of salt, and uniformly agitating the mixture to provide a uniform coating of fat over the protein particles. The premix was then coated on the frozen shrimp fibers by thorough mixing of the shrimp fibers and the premix. On completion of the coating step, water was added to provide a dough having a moisture level of approximately 50%. The dough was well mixed and then shaped by extrusion through a meat grinder, the extrusion causing the shrimp fibers to align themselves in a somewhat parallel relationship in the extruded dough.

The extruded dough pieces were placed in a circulating air oven at a temperature of 160° F. and an air velocity of 250 feet per minute. After approximately two hours, the dried product was found to have a moisture level of about 4%. Examination of the product indicated that the protein matrix had been coagulated by the heat of the oven prior to drying, and that the shrimp fibers had been cooked. The dried product was reduced to a particle size having a maximum dimension of about ½ inch.

The dehydrated shrimp "bits" prepared above were rehydrated by placing them in boiling water for 10 minutes. The rehydrated product had excellent flavor, texture and chewability.

EXAMPLE IV

The chicken "bits" prepared according to Example II above are incorporated in a dehydrated soup mix having the following formula:

*Chicken noodle soup mix*

| Ingredient: | Weight, in grams |
|---|---|
| Egg noodles | 30.0 |
| Salt | 5.0 |
| Mixed dehydrated vegetables | 3.5 |
| Monosodium glutamate | 6.5 |
| Chicken fat | 4.0 |
| Chicken "bits," prepared according to Example II | 6.5 |
| Starch | 4.0 |
| Hydrogenated vegetable oil | 3.5 |
| Spices | 1.0 |
| Total | 64.0 |

The mix given above is prepared for consumption by adding about 2 ounces of the mix to 32 ounces of water, bringing the water to a boil and cooking for seven minutes. The soup has an excellent flavor and the rehydrated chicken "bits" have the texture, flavor and chewability of pieces of freshly cooked chicken meat.

EXAMPLE V

The beef "bits" of Example I are incorporated in a dehydrated spaghetti sauce mix having the following formula:

*Spaghetti sauce with meat mix*

| Ingredient: | Weight, in grams |
|---|---|
| Dehydrated tomato flake | 20 |
| Sugar | 10 |
| Monosodium glutamate | 3 |
| Salt | 5 |
| Starch | 16 |
| Hydrogenated vegetable oil | 1 |
| Spices | 1 |
| Beef "bits" from Example I | 20 |
| | 76 |

The mix described above is prepared for consumption by adding the 76 grams of mix to 16 ounces of water, bringing the water to a boil, and allowing it to simmer for 10 minutes. Sufficient sauce is provided for four servings of spaghetti of 4 ounces each. The sauce has an excellent flavor and the beef "bits" have the texture, flavor and chewability of freshly cooked beef.

We claim:
1. A method of dehydrating a meat comprising the steps of reducing the meat to fibers, incorporating the fibers in an aqueous matrix of a heat coagulable protein selected from the group consisting of heat coagulable vegetable protein and mixtures thereof with egg albumin, coagulating the matrix about the fibers and then dehydrating the mixture to a stable moisture content.

2. A method of dehydrating meat according to claim 1, wherein the heat coagulable protein is a mixture of a sodium proteinate of soybean protein and egg albumin, and wherein the two proteins are present in an amount within the respective proportions by weight of from 17:1 to 5:1.

3. A method of dehydrating a meat comprising the steps of reducing the meat to fibers, incorporating the fibers in an aqueous matrix of a heat coagulable protein selected from the group consisting of heat coagulable vegetable protein and mixtures thereof with egg albumin, substantially aligning the fibers in the matrix, coagulating the matrix about the fibers and then dehydrating the mixture to a stable moisture content.

4. A method of dehydrating a meat comprising the steps of:
   (1) reducing the meat to fibers;
   (2) coating the fibers with a dry blended mixture of an edible fat, an edible salt, and a heat coagulable protein selected from the group consisting of a heat coagulable vegetable protein and mixtures thereof with egg albumin;
   (3) adding water to the coated fibers to provide a dough;
   (4) shaping the dough;
   (5) coagulating the dough about the fibers; and
   (6) dehydrating the mixture to a stable moisture content.

5. A method of dehydrating a meat comprising the steps of:
   (1) reducing a meat to fibers having the approximate dimensions of from 0.01 inch to 0.06 inch in diameter, and from ⅛ inch to 1½ inches in length;
   (2) coating the fibers with a dry blended mixture of an edible fat, an edible salt, and a heat coagulable protein comprising a mixture of egg albumin and heat coagulable sodium proteinate of soy, the proteins being combined in proportions 1:17 to 1:5 by weight;
   (3) adding water to the coated fibers in an amount sufficient to provide a dough having 40–60% moisture, by weight;

(4) aligning the fibers in the dough;
(5) shaping the dough;
(6) coagulating the protein in the dough about the fibers; and
(7) dehydrating the mixture to a moisture content of about 2–6%.

6. A dehydrated food product comprising from about 40% to about 70% of dehydrated meat fibers dispersed in a dehydrated matrix of a coagulated heat coagulable protein selected from the group consisting of heat coagulable vegetable protein and mixtures thereof with egg albumin, the matrix comprising from about 10% to about 40% of the product, the product containing from about 2 to about 6% moisture, and the percentages being by weight.

7. The dehydrated food product of claim 6, wherein the dehydrated meat fibers are substantially aligned within the matrix.

8. A dehydrated food product comprising from about 40% to about 70% of dehydrated meat fibers dispersed throughout a dehydrated matrix of a coagulated mixture of egg albumin and a sodium proteinate of soybean protein, the proteins being combined in proportions within the range of from 1:17 to 1:5 respectively, the matrix material being present at a level from 10% to 40%, the product containing from about 2% to about 6% moisture, and the percentages and proportions being by weight.

References Cited by the Examiner
UNITED STATES PATENTS

| | | | |
|---|---|---|---|
| 2,346,232 | 4/1944 | Piret et al. | 99—208 |
| 2,952,552 | 9/1960 | Ansel | 99—208 |
| 3,067,043 | 12/1962 | Marsh et al. | 99—208 |

A. LOUIS MONACELL, *Primary Examiner.*

HYMAN LORD, *Examiner.*